US009283730B2

(12) United States Patent
Zwick et al.

(10) Patent No.: US 9,283,730 B2
(45) Date of Patent: Mar. 15, 2016

(54) HIGH BASIS WEIGHT CREPED TISSUE

(75) Inventors: Kenneth John Zwick, Neenah, WI (US); Peter Lee Carson, Appleton, WI (US); Gary Lee Shanklin, Fremont, WI (US); Michael William Smaby, Neenah, WI (US); John Alexander Werner, IV, Hortonville, WI (US); Michael John Rekoske, Appleton, WI (US); Mike Thomas Goulet, Neenah, WI (US); Thomas Joseph Dyer, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 827 days.

(21) Appl. No.: 13/588,159

(22) Filed: Aug. 17, 2012

(65) Prior Publication Data
US 2014/0050889 A1    Feb. 20, 2014

(51) Int. Cl.
*D06N 7/04*    (2006.01)
*A61F 13/15*    (2006.01)
*B32B 5/26*    (2006.01)

(52) U.S. Cl.
CPC ............ *B32B 5/26* (2013.01); *B32B 2255/02* (2013.01); *B32B 2255/26* (2013.01); *B32B 2555/00* (2013.01); *Y10T 428/24446* (2015.01)

(58) Field of Classification Search
CPC ..... D21H 19/20; D21H 19/22; D21H 21/146; D21H 21/18; D21H 27/008; B32B 3/00; B32B 5/22; Y10T 428/24446
USPC .......... 428/152, 153, 154, 141; 162/111, 158, 162/168.1
See application file for complete search history.

(56) References Cited

U.S. PATENT DOCUMENTS

| | | |
|---|---|---|
| 3,879,257 A | 4/1975 | Gentile et al. |
| 4,158,594 A | 6/1979 | Becker et al. |
| 4,166,001 A | 8/1979 | Bicho et al. |
| 4,574,021 A | 3/1986 | Endres et al. |
| 4,816,320 A | 3/1989 | St. Cyr |
| 4,950,545 A | 8/1990 | Walter et al. |
| 5,164,046 A | 11/1992 | Ampulski et al. |
| 5,730,839 A | 3/1998 | Wendt et al. |
| 5,830,317 A | 11/1998 | Vinson et al. |
| 5,846,380 A | 12/1998 | Van et al. |
| 5,968,853 A | 10/1999 | Kelly et al. |
| 5,981,044 A | 11/1999 | Phan et al. |
| 6,054,020 A | 4/2000 | Goulet et al. |
| 6,162,327 A | 12/2000 | Batra et al. |
| 6,241,850 B1 | 6/2001 | Kelly |
| 6,332,952 B1 | 12/2001 | Hsu et al. |
| 6,454,901 B1 | 9/2002 | Sekiya et al. |
| 6,517,678 B1 | 2/2003 | Shannon et al. |
| 6,656,569 B1 | 12/2003 | Roussel et al. |

(Continued)

FOREIGN PATENT DOCUMENTS

| | | |
|---|---|---|
| EP | 0 144 658 A1 | 6/1985 |
| EP | 1 112 177 B1 | 2/2012 |

(Continued)

*Primary Examiner* — Catherine A Simone
(74) *Attorney, Agent, or Firm* — Kimberly-Clark Worldwide, Inc.

(57) ABSTRACT

In general, the present disclosure is directed to creped tissue webs, and products produced therefrom. The creped webs and products are strong, soft, and have fine crepe structure, such as less than about 12, measured as % COV at a STFI wavelength of 16 to 32 mm, using the test method set forth herein. Fine crepe structure is achieved even at basis weights in excess of 16 gsm per ply.

20 Claims, 1 Drawing Sheet

(56) References Cited

U.S. PATENT DOCUMENTS

| | | |
|---|---|---|
| 6,797,114 B2 | 9/2004 | Hu |
| 6,821,387 B2 | 11/2004 | Hu |
| 6,861,380 B2 | 3/2005 | Garnier et al. |
| 7,029,756 B2 | 4/2006 | Moline et al. |
| 7,517,433 B2 | 4/2009 | Zwick et al. |
| 7,785,443 B2 | 8/2010 | Hermans et al. |
| 7,803,249 B2 | 9/2010 | Dyer et al. |
| 7,807,023 B2 | 10/2010 | Dyer et al. |
| 7,879,190 B2 | 2/2011 | Dyer et al. |
| 7,883,604 B2 | 2/2011 | Dyer et al. |
| 8,025,764 B2 | 9/2011 | Bhat et al. |
| 8,070,913 B2 | 12/2011 | Salaam et al. |
| 8,123,905 B2 | 2/2012 | Luu et al. |
| 2003/0121627 A1 | 7/2003 | Hu et al. |
| 2003/0131960 A1 | 7/2003 | McConnell et al. |
| 2003/0192662 A1 | 10/2003 | Heath et al. |
| 2004/0163785 A1 | 8/2004 | Shannon et al. |
| 2004/0250969 A1 | 12/2004 | Luu et al. |
| 2006/0042767 A1 | 3/2006 | Bhat et al. |
| 2007/0137810 A1 | 6/2007 | Dyer et al. |
| 2007/0144697 A1* | 6/2007 | Dyer et al. .............. 162/158 |
| 2008/0187733 A1 | 8/2008 | Abbosh et al. |
| 2009/0188637 A1 | 7/2009 | Chan et al. |
| 2010/0155004 A1 | 6/2010 | Wang et al. |
| 2010/0212849 A1 | 8/2010 | Smith et al. |
| 2010/0224338 A1 | 9/2010 | Harper et al. |
| 2011/0198776 A1 | 8/2011 | Sekiya et al. |
| 2011/0303374 A1 | 12/2011 | Chan et al. |
| 2011/0303375 A1 | 12/2011 | Shannon et al. |
| 2012/0125552 A1 | 5/2012 | Goulet et al. |
| 2012/0164200 A1 | 6/2012 | Qin et al. |
| 2012/0255694 A1 | 10/2012 | Druecke et al. |

FOREIGN PATENT DOCUMENTS

| | | |
|---|---|---|
| GB | 2 006 296 A | 5/1979 |
| WO | WO 2008/003343 A1 | 1/2008 |
| WO | WO 2012/137102 A2 | 10/2012 |

\* cited by examiner ized. Basis weight
HIGH BASIS WEIGHT CREPED TISSUE

BACKGROUND

Consumers desire a soft tissue, but they also want the tissue to be thick, absorbent and durable to protect their hands when they blow. The consumers' desires present a dilemma for the tissue maker—thickness and absorbency may be achieved by increasing the basis weight of the tissue, but at the expense of increasing stiffness which reduces softness. Increasing basis weight also impairs softness by making the tissue web more difficult to process by creping as conventional creping chemistries are limited in their ability to produce a fine crepe structure at higher basis weights.

As such, a need currently exists for a creping composition that produces a soft tissue even at higher basis weight, such that the tissue maker may produce a soft, yet thick and absorbent tissue.

SUMMARY

Despite the tendency of increased basis weight, and in-turn sheet caliper, having a negative impact on creping, the present disclosure surprisingly provides a high basis weight web having a fine crepe structure. The novel tissue webs generally have basis weights greater than about 15 grams per square meter (gsm) and more preferably greater than about 16 gsm, while maintaining a fine crepe structure and yielding tissue products that are both thick and soft.

Accordingly, in one aspect the present disclosure provides a creped tissue product comprising at least one creped tissue web having a basis weight greater than about 16 gsm, a fine crepe structure, measured as % COV at a STFI wavelength of 16 to 32 mm, of less than about 12 and a geometric mean tensile less than about 500 g/3".

In still other aspects the present disclosure provides a multi-ply tissue product comprising two multi-layered creped tissue webs, the tissue webs having three superposed layers, an inner layer consisting essentially of softwood fibers and two outer layers consisting essentially of hardwood fibers, the inner layer being located between the two outer layers, wherein each web has a geometric mean tensile of less than about 500 g/3", a basis weight of at least about 16 gsm and a fine crepe structure, measured as % COV at a STFI wavelength of 16 to 32 mm, of less than about 12.

In other aspects the present disclosure provides a creped tissue web having a first side and a second side and a creping composition comprising a non-fibrous olefin polymer disposed on at least the first side, wherein the tissue web has a geometric mean tensile of less than about 500 g/3", a basis weight of at least about 16 gsm and wherein a fine crepe structure, measured as % COV at a STFI wavelength of 16 to 32 mm, of less than about 12.

In yet other aspects the disclosure provides a soft creped tissue web having a basis weight of at least about 16 gsm and a TS7 value from about 8 to about 10. Preferably, soft creped tissues having a high basis weight, such as at least about 16 gsm and low TS7 value, such as from about 8 to about 10, also have a fine crepe structure, such as less than about 12% COV, at a STFI wavelength of 16 to 32 mm.

Other features and aspects of the present disclosure are discussed in greater detail below.

DEFINITIONS

Figure 1:
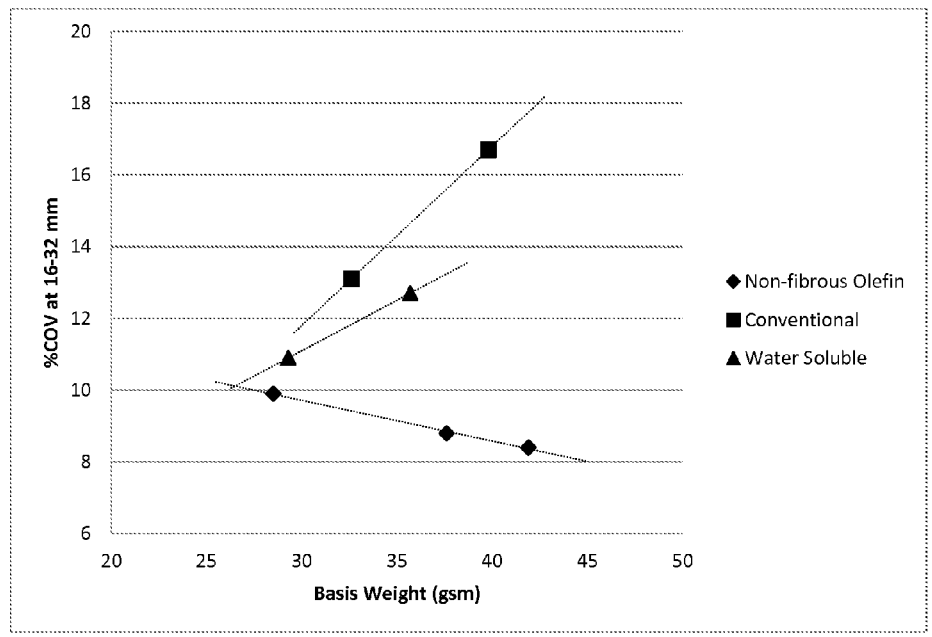
FIG. 1 is a comparison of basis weight (grams per square meter) and fine crepe structure (% COV at a STFI wavelength of 16 to 32 mm) for three different creping chemistries.
Figure 2:
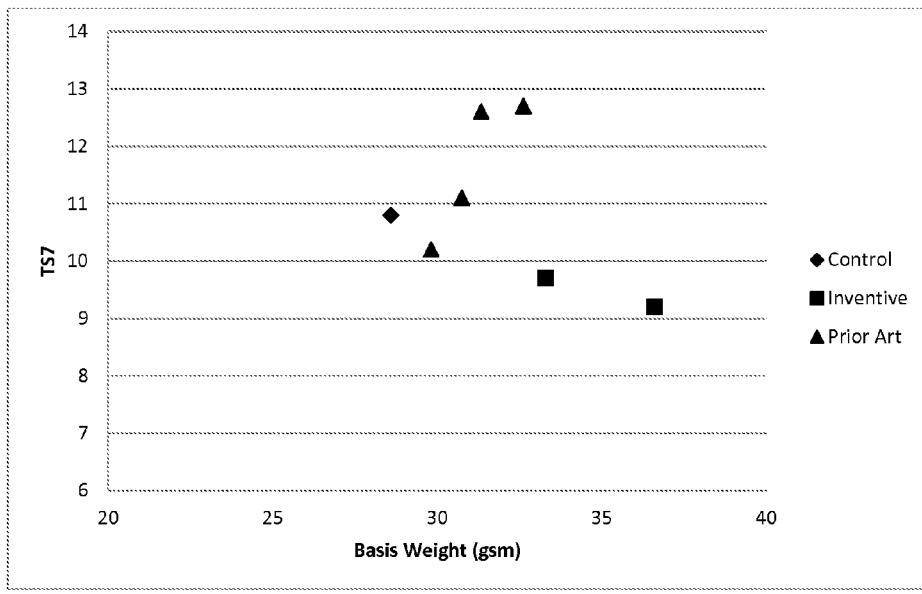
FIG. 2 is a comparison of tissue softness (TS7) and basis weight (grams per square meter) for various inventive, control and commercial tissues.

As used herein, the term "fine crepe structure" refers to the structure of crepe folds on the surface of a creped tissue web. Fine crepe structure is measured using the crepe structure test method described below. Fine crepe structure is reported as the percent coefficient-of-variation (% COV) at a STFI wavelength of 16 to 32 mm.

As used herein, the term "tissue product" refers to products made from base webs comprising fibers and includes, bath tissues, facial tissues, paper towels, industrial wipers, food-service wipers, napkins, medical pads, and other similar products.

As used herein, the terms "tissue web" and "tissue sheet" refer to a cellulosic web suitable for use in a tissue product.

As used herein the term "basis weight" generally refers to the conditioned weight per unit area of a tissue and is generally expressed as grams per square meter (gsm). Basis weight is measured herein using TAPPI test method T-220.

DETAILED DESCRIPTION

In general, the present disclosure is directed to creped tissue webs, and products produced therefrom. The creped webs and products are strong, soft, and have fine crepe structure, such as less than about 12, measured as % COV at a STFI wavelength of 16 to 32 mm, using the test method set forth herein. Fine crepe structure is achieved even at basis weights in excess of 16 gsm per ply. Generally, as basis weight increases, crepe structure becomes coarser and the overall handfeel and softness of the tissue diminishes. Surprisingly however, the inventors have arrived at webs that have increased basis weights, compared to conventional tissue, yet have fine crepe structure, yielding tissue that is both strong and soft.

In one embodiment, the tissue webs are creped, wherein the creping composition comprises a thermoplastic resin, such as the composition disclosed in U.S. Pat. No. 7,807,023, which is incorporated herein in a manner consistent with the present disclosure. The thermoplastic resin may be contained, for instance, in an aqueous dispersion prior to application to the creping surface. In one particular embodiment, the creping composition may comprise a non-fibrous olefin polymer. The creping composition, for instance, may comprise a film-forming composition and the olefin polymer may comprise an interpolymer of ethylene and at least one comonomer comprising an alkene, such as 1-octene. The creping composition may also contain a dispersing agent, such as a carboxylic acid. Examples of particular dispersing agents, for instance, include fatty acids, such as oleic acid or stearic acid.

In one particular embodiment, the creping composition may contain an ethylene and octene copolymer in combination with an ethylene-acrylic acid copolymer. The ethylene-acrylic acid copolymer is not only a thermoplastic resin, but may also serve as a dispersing agent. The ethylene and octene copolymer may be present in combination with the ethylene-acrylic acid copolymer in a weight ratio of from about 1:10 to about 10:1, such as from about 2:3 to about 3:2.

The olefin polymer composition may exhibit a crystallinity of less than about 50 percent, such as less than about 20 percent. The olefin polymer may also have a melt index of less than about 1000 g/10 min, such as less than about 700 g/10 min. The olefin polymer may also have a relatively small particle size, such as from about 0.05 micron to about 5 microns when contained in an aqueous dispersion.

In an alternative embodiment, the creping composition may contain an ethylene-acrylic acid copolymer. The ethylene-acrylic acid copolymer may be present in the creping composition in combination with a dispersing agent, such as a fatty acid.

Once applied to a tissue web, it has been discovered that the creping composition may form a discontinuous film depending upon the amount applied to the web. In other embodiments, the creping composition may be applied to a web such that the creping composition forms discrete treated areas on the surface of the web.

Accordingly, in certain embodiments the disclosure provides a creped tissue product, wherein the product has a basis weight of at least about 30 gsm, and more preferably at least about 32 gsm, such as from about 32 to about 36 gsm. The tissue products preferably has a fine crepe structure, measured as % COV at a STFI wavelength of 16 to 32 mm, of less than about 12 and more preferably less than about 14, and still more preferably less than about 12, such as from about 8 to about 12. Further, tissue products having a fine crepe structure and increased basis weight preferably have a geometric mean tensile less than about 1000 g/3" and more preferably less than about 800 g/3".

In general, any suitable fibrous web may be treated in accordance with the present disclosure. For example, in one aspect, the base sheet can be a tissue product, such as a bath tissue, a facial tissue, a paper towel, a napkin, and the like. Fibrous products can be made from any suitable types of fiber. Fibrous products made according to the present disclosure may include single-ply fibrous products or multiple-ply fibrous products. For instance, in some aspects, the product may include two plies, three plies, or more.

Fibers suitable for making fibrous webs comprise any natural or synthetic fibers including both nonwoody fibers and woody or pulp fibers. Pulp fibers can be prepared in high-yield or low-yield forms and can be pulped in any known method, including kraft, sulfite, high-yield pulping methods and other known pulping methods. Fibers prepared from organosolv pulping methods can also be used, including the fibers and methods disclosed in U.S. Pat. Nos. 4,793,898, 4,594,130, 3,585,104. Useful fibers can also be produced by anthraquinone pulping, exemplified by U.S. Pat. No. 5,595,628.

The fibrous webs of the present disclosure can also include synthetic fibers. For instance, the fibrous webs can include up to about 10 percent, such as up to about 30 percent or up to about 50 percent or up to about 70 percent or more by dry weight, to provide improved benefits. Suitable synthetic fibers include rayon, polyolefin fibers, polyester fibers, bicomponent sheath-core fibers, multi-component binder fibers, and the like. Synthetic cellulose fiber types include rayon in all its varieties and other fibers derived from viscose or chemically-modified cellulose.

Chemically treated natural cellulosic fibers can be used, for example, mercerized pulps, chemically stiffened or crosslinked fibers, or sulfonated fibers. For good mechanical properties in using web forming fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable web forming fibers can also include recycled fibers, virgin fibers, or mixes thereof.

In general, any process capable of forming a web can also be utilized in the present disclosure. For example, a web forming process of the present disclosure can utilize creping, wet creping, double creping, recreping, double recreping, embossing, wet pressing, air pressing, through-air drying, hydroentangling, creped through-air drying, co-forming, air-laying, as well as other processes known in the art. For hydroentangled material, the percentage of pulp is about 70 to 85 percent.

Also suitable for articles of the present disclosure are fibrous sheets that are pattern densified or imprinted, such as the fibrous sheets disclosed in any of the following U.S. Pat. Nos. 4,514,345, 4,528,239, 5,098,522, 5,260,171, and 5,624,790, the disclosures of which are incorporated herein by reference to the extent they are non-contradictory herewith. Such imprinted fibrous sheets may have a network of densified regions that have been imprinted against a drum dryer by an imprinting fabric, and regions that are relatively less densified (e.g., "domes" in the fibrous sheet) corresponding to deflection conduits in the imprinting fabric, wherein the fibrous sheet superposed over the deflection conduits was deflected by an air pressure differential across the deflection conduit to form a lower-density pillow-like region or dome in the fibrous sheet.

The fibrous web can also be formed without a substantial amount of inner fiber-to-fiber bond strength. In this regard, the fiber furnish used to form the base web can be treated with a chemical debonding agent. The debonding agent can be added to the fiber slurry during the pulping process or can be added directly to the headbox. Suitable debonding agents that may be used in the present disclosure include cationic debonding agents such as fatty dialkyl quaternary amine salts, mono fatty alkyl tertiary amine salts, primary amine salts, imidazoline quaternary salts, silicone, quaternary salt and unsaturated fatty alkyl amine salts. Other suitable debonding agents are disclosed in U.S. Pat. No. 5,529,665, which is incorporated herein by reference in a manner consistent herewith.

In certain embodiments webs prepared according to the present disclosure may be post treated to provide additional benefits. The types of chemicals that may be added to the web include absorbency aids usually in the form of cationic or non-ionic surfactants, humectants and plasticizers such as low molecular weight polyethylene glycols and polyhydroxy compounds such as glycerin and propylene glycol. Materials that supply skin health benefits such as mineral oil, aloe extract, vitamin-E, silicone, lotions in general, and the like, may also be incorporated into the finished products. Such chemicals may be added at any point in the web forming process.

Fibrous webs that may be treated in accordance with the present disclosure may include a single homogenous layer of fibers or may include a stratified or layered construction. For instance, the fibrous web ply may include two or three layers of fibers. Each layer may have a different fiber composition. For example a three-layered headbox generally includes an upper head box wall and a lower head box wall. Headbox further includes a first divider and a second divider, which separate three fiber stock layers.

Each of the fiber layers comprises a dilute aqueous suspension of papermaking fibers. The particular fibers contained in each layer generally depend upon the product being formed and the desired results. For instance, the fiber composition of each layer may vary depending upon whether a bath tissue product, facial tissue product or paper towel is being produced. In one aspect, for instance, the middle layer contains southern softwood kraft fibers either alone or in combination with other fibers such as high yield fibers. Outer layers, on the other hand, contain softwood fibers, such as northern softwood kraft. In an alternative aspect, the middle layer may contain softwood fibers for strength, while the outer layers may comprise hardwood fibers, such as eucalyptus fibers, for a perceived softness.

In general, any process capable of forming a base sheet may be utilized in the present disclosure. For example, an endless traveling forming fabric, suitably supported and driven by rolls, receives the layered papermaking stock issuing from the headbox. Once retained on the fabric, the layered fiber suspension passes water through the fabric. Water removal is achieved by combinations of gravity, centrifugal force and vacuum suction depending on the forming configuration. Forming multi-layered paper webs is also described and disclosed in U.S. Pat. No. 5,129,988, which is incorporated herein by reference in a manner that is consistent herewith.

Preferably the formed web is dried by transfer to the surface of a rotatable heated dryer drum, such as a Yankee dryer. In accordance with the present disclosure, the creping composition may be applied topically to the tissue web while the web is traveling on the fabric or may be applied to the surface of the dryer drum for transfer onto one side of the tissue web. In this manner, the creping composition is used to adhere the tissue web to the dryer drum. In this embodiment, as the web is carried through a portion of the rotational path of the dryer surface, heat is imparted to the web causing most of the moisture contained within the web to be evaporated. The web is then removed from the dryer drum by a creping blade. Creping the web, as it is formed, further reduces internal bonding within the web and increases softness. Applying the creping composition to the web during creping, on the other hand, may increase the strength of the web.

In another embodiment the formed web is transferred to the surface of the rotatable heated dryer drum, which may be a Yankee dryer. The press roll may, in one embodiment, comprise a suction pressure roll. In order to adhere the web to the surface of the dryer drum, a creping adhesive may be applied to the surface of the dryer drum by a spraying device. The spraying device may emit a creping composition made in accordance with the present disclosure or may emit a conventional creping adhesive. The web is adhered to the surface of the dryer drum and then creped from the drum using the creping blade. If desired, the dryer drum may be associated with a hood. The hood may be used to force air against or through the web.

In other embodiments, once creped from the dryer drum, the web may be adhered to a second dryer drum. The second dryer drum may comprise, for instance, a heated drum surrounded by a hood. The drum may be heated from about 25° C. to about 200° C., such as from about 100° C. to about 150° C.

In order to adhere the web to the second dryer drum, a second spray device may emit an adhesive onto the surface of the dryer drum. In accordance with the present disclosure, for instance, the second spray device may emit a creping composition as described above. The creping composition not only assists in adhering the tissue web to the dryer drum, but also is transferred to the surface of the web as the web is creped from the dryer drum by the creping blade. Once creped from the second dryer drum, the web may, optionally, be fed around a cooling reel drum and cooled prior to being wound on a reel.

In addition to applying the creping composition during formation of the fibrous web, the creping composition may also be used in post-forming processes. For example, in one aspect, the creping composition may be used during a print-creping process. Specifically, once topically applied to a fibrous web, the creping composition has been found well-suited to adhering the fibrous web to a creping surface, such as in a print-creping operation.

For example, once a fibrous web is formed and dried the creping composition may be applied to at least one side of the web and the at least one side of the web may then be creped. In general, the creping composition may be applied to only one side of the web and only one side of the web may be creped, the creping composition may be applied to both sides of the web and only one side of the web is creped, or the creping composition may be applied to each side of the web and each side of the web may be creped.

In one embodiment the creping composition may be added to one side of the web by creping, using either an in-line or off-line process. A tissue web is passed through a first creping composition application station that includes a nip formed by a smooth rubber press roll and a patterned rotogravure roll. The rotogravure roll is in communication with a reservoir containing a first creping composition. The rotogravure roll applies the creping composition to one side of web in a preselected pattern. The web is then contacted with a heated roll, which can be heated to a temperature, for instance, up to about 200° C., and more preferably from about 100° C. to about 150° C. In general, the web can be heated to a temperature sufficient to dry the web and evaporate any water. It should be understood, that besides the heated roll, any suitable heating device can be used to dry the web. For example, in an alternative embodiment, the web can be placed in communication with an infra-red heater in order to dry the web. Besides using a heated roll or an infra-red heater, other heating devices can include, for instance, any suitable convective oven or microwave oven.

From the heated roll, the web can be advanced by pull rolls to a second creping composition application station, which includes a transfer roll in contact with a rotogravure roll, which is in communication with a reservoir containing a second creping composition. The second creping composition may be applied to the opposite side of the web in a preselected pattern. The first and second creping compositions may contain the same ingredients or may contain different ingredients. Alternatively, the creping compositions may contain the same ingredients in different amounts as desired. Once the second creping composition is applied the web is adhered to a creping roll by a press roll and carried on the surface of the creping drum for a distance and then removed therefrom by the action of a creping blade. The creping blade performs a controlled pattern creping operation on the second side of the tissue web. Although the creping composition is being applied to each side of the tissue web, only one side of the web undergoes a creping process. It should be understood, however, that in other embodiments both sides of the web may be creped.

Once creped the tissue web may be pulled through a drying station. The drying station can include any form of a heating unit, such as an oven energized by infra-red heat, microwave energy, hot air, or the like. A drying station may be necessary in some applications to dry the web and/or cure the creping composition. Depending upon the creping composition selected, however, in other applications a drying station may not be needed.

The creping compositions of the present disclosure are typically transferred to the web at high levels, such that at least about 30 percent of the creping composition applied to the Yankee is transferred to the web, more preferably at least about 45 percent is transferred and still more preferably at least about 60 percent is transferred. Generally from about 45 to about 65 percent of the creping composition applied to the Yankee dryer is transferred to the web. Thus, the amount of creping additive transferred to the sheet is a function of the amount of creping additive applied to the Yankee dryer.

The total amount of creping composition applied to each side of the web can be in the range of from about 0.1 to about 10 percent by weight, based upon the total weight of the web, such as from about 0.3 to about 5 percent by weight, such as from about 0.5 to about 3 percent by weight. To achieve the desired additive application levels the add on rate of creping composition to the dryer, measured as mass (i.e., mg) per unit area of dryer surface (i.e., $m^2$), may range from about 50 to about 300 mg/$m^2$, and still more preferably from about 100 to about 250 mg/$m^2$.

Further, the creping composition is applied to the paper web so as to cover from about 15 to about 100 percent of the surface area of the web. More particularly, in most applications, the creping composition will cover from about 20 to about 60 percent of the surface area of each side of the web.

In one aspect, fibrous webs made according to the present disclosure can be incorporated into multiple-ply products. For instance, in one aspect, a fibrous web made according to the present disclosure can be attached to one or more other fibrous webs for forming a wiping product having desired characteristics. The other webs laminated to the fibrous web of the present disclosure can be, for instance, a wet-creped web, a calendered web, an embossed web, a through-air dried web, a creped through-air dried web, an uncreped through-air dried web, an airlaid web, and the like.

In one aspect, when incorporating a fibrous web made according to the present disclosure into a multiple-ply product, it may be desirable to only apply the creping composition to one side of the fibrous web and to thereafter crepe the treated side of the web. The creped side of the web is then used to form an exterior surface of a multiple-ply product. The untreated and uncreped side of the web, on the other hand, is attached by any suitable means to one or more plies.

In multiple-ply products, the basis weight of each fibrous web present in the product may vary. In general, the total basis weight of a multiple-ply product will generally be from about 30 to about 60 gsm, such as from about 32 to about 45 gsm, and more preferably from about 35 to about 40 gsm. In particularly preferred embodiments the tissue product is a multi-ply facial tissue wherein each ply has a basis weight from about 15 to about 30 gsm, such as from about 16 to about 22.5 gsm, and more preferably from about 17.5 to about 20 gsm.

Webs made according to the above processes, and products formed therefrom, have fine structure, particularly for the basis weight, such as less than about 14, measured as % COV at a STFI wavelength of 16 to 32 mm, more preferably less than about 12, and still more preferably less than about 10. For instance, a web having a basis weight from about 15 to about 25 gsm, or a product having a basis weight from about 30 to 50 gsm, fine crepe structure may range from about 4 to about 14 percent COV, such as from about 5 to about 12 percent COV and more preferably from about 6 to about 10 percent COV measured as % COV at a STFI wavelength of 16 to 32 mm.

In addition to having fine crepe structures, webs and products prepared according to the present disclosure have improved softness, especially when prepared at higher basis weights, such as greater than about 15 gsm and more preferably greater than about 16 gsm, per ply. For example, tissue webs having a basis weight of at least about 16 gsm have a tissue softness value (also referred to herein as a "TS7 value"), measured using EMTEC Tissue Softness Analyzer ("TSA") (Emtec Electronic GmbH, Leipzig, Germany) as described in the Test Methods section, from about 8 to about 10.

Moreover, the relatively fine crepe structures are achieved at relatively modest geometric mean tensile strengths. This provides a tissue having the requisite softness without excessive stiffness. For example, creped tissue products prepared according to the present disclosure have geometric mean tensile strengths of less than about 1000 grams per 3 inches (g/3"), and more preferably less than about 900 g/3", such as from about 700 to about 1000 g/3". Similarly, webs having fine creped structure may have a geometric mean tensile of less than about 500 g/3", and more preferably less than about 450 g/3" and still more preferably less than about 400 g/3".

Test Methods

Fine Crepe Structure

To determine the structure of the tissue sheet after creping the crepe structure was characterized using tissue images and the STFI mottling program as described in US Publication No. 2010/0155004 with the following modifications. The STFI mottling program has been written to run with Matlab computer software for computation and programming. A grayscale image is uploaded to the program where an image of the tissue in question had been generated under controlled, low-angle lighting conditions with a video camera, frame grabber and an image acquisition algorithm.

A Leica DFX-300 camera (Leica Microsystems Ltd, Heerbrugg, Switzerland) 420 is mounted on a Polaroid MP-4 Land Camera (Polaroid Resource Center, Cambridge, Mass.) standard support 422. The support is attached to a Kreonite macro-viewer (Kreonite, Inc., Wichita, Kans.). An auto-stage, DCI Model HM-1212, is placed on the upper surface of the Kreonite macro-viewer and the sample mounting apparatus was placed atop the auto-stage. The auto-stage is a motorized apparatus known to those skilled in the analytical arts and is commercially available from Design Components Incorporated (Franklin, Mass.). The auto stage is used to move the sample in order to obtain 15 separate and distinct, non-overlapping images from the specimen. The sample mounting apparatus 424 is placed on the auto macro-stage (DCI 12×12 inch) of an image analysis system controlled by Leica Microsystems QWIN Pro software, under the optical axis of a 60-mm AF Micro Nikon lens (Nikon Corp., Japan) fitted with a 20-mm extension tube. The lens focus is adjusted to provide the maximum magnification and the camera position on the Polaroid MP-4 support is adjusted to provide optimum focus of the tissue edge. The sample is illuminated from beneath the auto-stage using a Chroma Pro 45 (Circle 2, Inc., Tempe, Ariz.). The Chroma Pro settings are such that the light is 'white' and not filtered in any way to bias the light's spectral output. The Chroma Pro may be connected to a POWERSTAT Variable Auto-transformer, type 3PN117C, which may be purchased from Superior Electric, Co. having an office in Bristol, Conn. The auto-transformer is used to adjust the Chroma Pro's illumination level. The resulting image has a pixel resolution of 1024×1024 and represents a 12.5 mm×12.5 mm field of view.

The image analysis system used to perform the PR/EL measurements may be a QWIN Pro (Leica Microsystems, Heerbrugg, Switzerland). The system is controlled and run by Version 3.2.1 of the QWIN Pro software. The image analysis algorithm 'FOE3a' is used to acquire and process grayscale monochrome images using Quantimet User Interactive Programming System (QUIPS) language. Alternatively, the FOE3a program could be used with newer QWIN Pro platforms which run newer versions of the software (e.g. QWIN Pro Version 3.5.1). The image analysis program was previously described in US Publication No. 2010/0155004.

The STFI mottling software analyzes the grayscale variation of the image in both the MD and CD directions by using FFT (Fast Fourier Transform). The FFT is used to develop grayscale images at different wavelength ranges based on the frequency information present within the FFT. The grayscale coefficient-of-variation (% COV) is then calculated from each of the images (e.g. inverse FFT's) corresponding to the wavelengths which were pre-determined by the STFI software. Since these images are generated with low-angle lighting, the tissue surface structure is shown as areas of light and dark, due to shadowing, and consequently the grayscale variation can be related to the tissue surface structure. For each sample, 3 tissue samples are analyzed with 6 images generated for each tissue sample, resulting in a total of 18 images analyzed per sample. Thus, the reported fine crepe structure is an average of the 18 images and is reported as % COV at a STFI wavelength of 16 to 32 mm.

Tissue Softness

Sample softness was analyzed using an EMTEC Tissue Softness Analyzer ("TSA") (Emtec Electronic GmbH, Leipzig, Germany). The TSA comprises a rotor with vertical blades which rotate on the test piece applying a defined contact pressure. Contact between the vertical blades and the test piece creates vibrations, which are sensed by a vibration sensor. The sensor then transmits a signal to a PC for processing and display. The signal is displayed as a frequency spectrum. The frequency analysis in the range of approximately 200 Hz to 1000 Hz represents the surface smoothness or texture of the test piece. A high amplitude peak correlates to a rougher surface. A further peak in the frequency range between 6 kHZ and 7 kHZ represents the softness of the test piece. The peak in the frequency range between 6 kHZ and 7 kHZ is herein referred to as the TS7 Softness Value and is expressed as dB V2 rms. The lower the amplitude of the peak occurring between 6 kHZ and 7 kHZ, the softer the test piece.

Test samples were prepared by cutting a circular sample having a diameter of 112.8 mm. All samples were allowed to equilibrate at TAPPI standard temperature and humidity conditions for at least 24-hours prior to completing the TSA testing. Only one ply of tissue is tested. Multi-ply samples are separated into individual plies for testing. The sample is placed in the TSA with the softer (dryer or Yankee) side of the sample facing upward. The sample is secured and the TS7 Softness Values measurements are started via the PC. The PC records, processes and stores all of the data according to standard TSA protocol. The reported TS7 Softness Value is the average of 5 replicates, each one with a new sample.

Examples

Inventive sample codes were made using a wet pressed process utilizing a Crescent Former. Initially, northern softwood kraft (NSWK) pulp was dispersed in a pulper for 30 minutes at 4 percent consistency at about 100° F. The NSWK pulp was then transferred to a dump chest and subsequently diluted to approximately 3 percent consistency. The NSWK pulp was refined at about 1 HP-days/MT. Softwood fibers were then pumped to a machine chest and mixed with 2 kg/MT of Kymene® 920A (Ashland Water Technologies, Wilmington, Del.) and 1 kg/MT Baystrength 3000 (Kemira, Atlanta, Ga.) of prior to the headbox. The softwood fibers were added to the middle side layer in the 3-layer tissue structure. The virgin NSWK fiber content contributed approximately 32% of the final sheet weight.

Eucalyptus hardwood kraft (EHWK) pulp was dispersed in a pulper for 30 minutes at about 4% consistency at about 100° F. The EHWK pulp was then transferred to a dump chest and subsequently diluted to about 3% consistency. The EHWK pulp fibers were then pumped to a machine chest where they were mixed with 2 kg/MT of Kymene® 920A. These fibers were added to dryer and felt layers, as indicated in the Table below.

TABLE 1

| Layer | Fiber Type | Additives | Weight % (total web) |
|---|---|---|---|
| Dryer | EHWK | 2 kg/MT Kymene ® 920A | 44 |
| Middle | NSWK | 2 kg/MT Kymene ® 920A 1 kg/MT Baystrength ™ 3000 | 32 |
| Felt | EHWK | 2 kg/MT Kymene ® 920 A | 24 |

The pulp fibers from the machine chests were pumped to the headbox at a consistency of about 0.1%. Pulp fibers from each machine chest were sent through separate manifolds in the headbox to create a 3-layered tissue structure. The fibers were deposited onto a felt using a Crescent Former.

The wet sheet, about 10 to 20 percent consistency, was adhered to a Yankee dryer, traveling at about 2000 fpm (610 mpm) through a nip via a pressure roll. The consistency of the wet sheet after the pressure roll nip (post-pressure roll consistency or PPRC) was approximately 40 percent. The wet sheet is adhered to the Yankee dryer due to the creping composition that is applied to the dryer surface. A spray boom situated underneath the Yankee dryer sprayed the creping composition onto the dryer surface.

Three different creping compositions were evaluated. A conventional creping composition comprising, by weight on a solids basis, 70 percent Crepetrol™ Xcel and 30 percent Crepetrol™ 874 (both commercially available from Ashland Water Technologies, Wilmington, Del.) was prepared at about 1 percent solids. The flow rates of the conventional creping chemistry were varied to deliver a total addition of about 10 mg/m² spray coverage on the Yankee Dryer at the desired component ratio.

The second creping composition comprised a non-fibrous olefin dispersion, sold under the trade name HYPOD 8510 (Dow Chemical Co., Midland, Mich.). The HYPOD 8510 was prepared at 30 percent solids and delivered at a total addition of about 200 mg/m² spray coverage on the Yankee Dryer.

A water soluble creping composition comprising Glucosol™ 800 (Chemstar, Minneapolis, Minn.), Carbowax™ PEG 8000 (Dow Chemical Co., Midland, Mich.) and Polyox™ N80 (Colorcon, Inc., West Point, Pa.) was prepared dissolving solid polymers into water followed by stirring until the solution was homogeneous. Each polymer was dissolved and pumped separately to the process. Glucosol™ 800 was prepared at 5 percent solids, Polyox™ N80 was prepared at 2.5 percent solids and Carbowax™ PEG 8000 was prepared at 10 percent solids. The flow rates of the individual components were varied to deliver the desired spray coverage on the Yankee Dryer at the desired component ratio.

TABLE 2

| Creping Composition | 1st Creping Component (wt %) | 2nd Creping Component (wt %) | 3rd Creping Component (wt %) | Total Addition (mg/m²) |
|---|---|---|---|---|
| Conventional | Crepetrol ™ Xcel (70%) | Crepetrol ™ 874 (30%) | — | 10 |
| Water Soluble | Polyox ™ N80 (25%) | Carbowax ™ PEG 8000 (76%) | Glucosol ™ 800 (19%) | 150 |
| Non-fibrous Olefin | HYPOD 8510 | — | — | 200 |

The sheet was dried to about 98 to 99 percent consistency as it traveled on the Yankee dryer and to the creping blade. The creping blade subsequently scraped the tissue sheet and a portion of the creping composition off the Yankee dryer. The creped tissue basesheet was then wound onto a core traveling at about 1575 fpm (480 mpm) into soft rolls for converting. Two soft rolls of the creped tissue were then rewound, calendered, and plied together so that both creped sides were on the outside of the 2-ply structure. Mechanical crimping on the edges of the structure held the plies together. The plied sheet was then slit on the edges to a standard width of approximately 8.5 inches, and cut to facial tissue length. Tissue samples were conditioned and tested.

TABLE 3

| Sample | Creping Composition | Basis Weight (gsm) | Add-on (mg/m²) | Fine Crepe Structure (% COV at 16-32 mm) | GMT (g/3") | Caliper (µm) |
|---|---|---|---|---|---|---|
| 1 | Conventional | 32.6 | 10 | 13.1 | 689 | 239 |
| 2 | Conventional | 39.8 | 10 | 16.7 | 561 | 269 |
| 3 | Non-fibrous Olefin | 28.5 | 200 | 9.9 | 798 | 202 |
| 4 | Non-fibrous Olefin | 41.9 | 200 | 8.4 | 1184 | 256 |
| 5 | Non-fibrous Olefin | 37.6 | 200 | 8.8 | 1082 | 236 |
| 6 | Water Soluble | 29.3 | 150 | 10.9 | 710 | 213 |
| 7 | Water Soluble | 35.7 | 150 | 12.7 | 723 | 264 |

Referring to FIG. 1, the effect of basis weight on fine crepe structure is illustrated for the three creping compositions of the present example. As illustrated in FIG. 1, fine crepe structure increases as basis weight increases for tissue webs treated with conventional creping compositions. However, for webs prepared according to the present disclosure an increase in basis weight is accompanied by a decrease in fine crepe structure.

To further explore the relationship between basis weight and softness additional samples were prepared as described above. The non-fibrous olefin creping composition was applied at an add-on level of 100 mg/m² to prepare both the control and inventive samples. Tissue softness was measured using the TSA instrument as described above. The physical properties of the resulting tissues, as well as comparative commercial tissue samples, are summarized in the table below.

TABLE 7

| Sample | Creping Composition | Add-On (mg/m²) | Basis Weight (gsm) | TS7 |
|---|---|---|---|---|
| Control | Non-fibrous Olefin | 100 | 28.6 | 10.8 |
| Inventive | Non-fibrous Olefin | 100 | 33.3 | 9.7 |
| Inventive | Non-fibrous Olefin | 100 | 36.6 | 9.2 |
| Publix ® Facial Tissue | — | — | 32.62 | 12.7 |
| Puffs Basic ® Facial Tissue | — | — | 29.82 | 10.2 |
| Scotties ® 2-Ply Facial Tissue | — | — | 31.34 | 12.6 |
| Up&Up ™ Everyday Facial Tissue | — | — | 30.75 | 11.1 |

These and other modifications and variations to the present invention may be practiced by those of ordinary skill in the art. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

We claim:

1. A creped tissue product comprising at least one creped tissue web having a basis weight greater than about 16 gsm, a fine crepe structure, measured as % COV at a STFI wavelength of 16 to 32 mm, of less than about 12 and a geometric mean tensile less than about 500 g/3".

2. The creped tissue product of claim 1 comprising two or more creped tissue webs, wherein the basis weight of each web is from about 16.5 to about 20 gsm.

3. The creped tissue product of claim 1, wherein the geometric mean tensile of the product is less than about 1000 g/3".

4. The creped tissue product of claim 1, wherein at least one creped tissue web has a fine crepe structure, measured as % COV at a STFI wavelength of 16 to 32 mm, is from about 5 to about 10.

5. The creped tissue product of claim 1, wherein at least one creped tissue web comprises a blend of hardwood fibers and softwood fibers, the hardwood fibers comprising at least about 60 percent and the softwood fibers comprising less than about 40 percent of the total weight of the web.

6. The creped tissue product of claim 1, wherein at least one creped tissue web comprises an inner layer and at least one outer layer contiguous with the inner layer.

7. The creped tissue product of claim 6, wherein the at least one creped tissue web comprises an inner layer disposed between two outer layers.

8. The creped tissue product of claim 7, wherein the inner layer comprises softwood fibers and the outer layers comprise hardwood fibers.

9. A multi-ply tissue product comprising two multi-layered creped tissue webs, the tissue webs having three superposed layers, an inner layer consisting essentially of softwood fibers and two outer layers consisting essentially of hardwood fibers, the inner layer being located between the two outer layers, wherein each web has a geometric mean tensile of less than about 500 g/3", a basis weight of at least about 16 gsm and a fine crepe structure, measured as % COV at a STFI wavelength of 16 to 32 mm, of less than about 12.

10. The creped tissue product of claim 9, wherein the basis weight of the product is from about 33 to about 42 gsm.

11. The creped tissue product of claim 9, wherein the geometric mean tensile of the product is from about 600 to about 1000 g/3".

12. The creped tissue product of claim 9, wherein the fine crepe structure, measured as % COV at a STFI wavelength of 16 to 32 mm, is from about 5 to about 10.

13. The creped tissue product of claim 9, wherein the hardwood fibers comprising at least about 60 percent and the softwood fibers comprising less than about 40 percent of the total weight of the web.

14. A creped tissue web having a first side and a second side and a creping composition comprising a non-fibrous olefin polymer disposed on at least the first side, wherein the tissue web has a geometric mean tensile of less than about 500 g/3", a basis weight of at least about 16 gsm and wherein a fine crepe structure, measured as % COV at a STFI wavelength of 16 to 32 mm, of less than about 12.

15. The creped tissue web of claim 14, wherein the basis weight of the tissue web is from about 16.5 to about 20 gsm.

16. The creped tissue web of claim 14, wherein the geometric mean tensile of the tissue web is from about 300 to about 500 g/3".

17. The creped tissue web of claim 14 wherein the fine crepe structure of the tissue web, measured as % COV at a STFI wavelength of 16 to 32 mm, is from about 5 to about 10.

18. The creped tissue web of claim 14, wherein of the tissue web comprises a blend of hardwood fibers and softwood fibers, the hardwood fibers comprising at least about 60 percent and the softwood fibers comprising less than about 40 percent of the total weight of the web.

19. The creped tissue web of claim 14, wherein the olefin polymer comprises an alpha-olefin interpolymer of ethylene and at least one comonomer selected from the group consisting of a $C_{4-20}$ linear, branched or cyclic diene, vinyl acetate, and a compound represented by the formula $H_2C{=}CHR$, wherein R is a $C_{1-20}$ linear, branched or cyclic alkyl group or a $C_{6-20}$ aryl group, or the alpha-olefin polymer comprises a copolymer of propylene with at least one comonomer selected from the group consisting of ethylene, a $C_{4-20}$ linear, branched or cyclic diene, and a compound represented by the formula $H2C{=}CHR$, wherein R is a $C_{1-20}$ linear, branched or cyclic alkyl group or a $C_{6-20}$ aryl group.

20. The creped tissue web of claim 14, wherein the creping composition is present on or in the tissue web in an amount from about 0.1 to about 20 percent by weight of the web.

* * * * *